(12) United States Patent
Marsh

(10) Patent No.: US 10,414,260 B1
(45) Date of Patent: Sep. 17, 2019

(54) VEHICLE HAIL COVER SYSTEM AND METHOD OF USE

(71) Applicant: Thomas Marsh, Plano, TX (US)

(72) Inventor: Thomas Marsh, Plano, TX (US)

( * ) Notice: Subject to any disclaimer, the term of this patent is extended or adjusted under 35 U.S.C. 154(b) by 0 days.

(21) Appl. No.: 15/806,040

(22) Filed: Nov. 7, 2017

Related U.S. Application Data

(60) Provisional application No. 62/418,385, filed on Nov. 7, 2016.

(51) Int. Cl.
   *B60J 11/04* (2006.01)

(52) U.S. Cl.
   CPC ..................... *B60J 11/04* (2013.01)

(58) Field of Classification Search
   CPC .... B60R 1/06; B60J 11/00; B60J 11/06; B60J 11/02; B64F 1/0054
   USPC ...... 150/154, 166; 296/136, 136.01, 136.07; D12/401, 402, 409; D6/610
   See application file for complete search history.

(56) References Cited

U.S. PATENT DOCUMENTS

| | | | | |
|---|---|---|---|---|
| 1,728,437 | A * | 9/1929 | Mott | B60J 11/00 150/166 |
| 5,241,977 | A * | 9/1993 | Flores | B60J 11/00 135/119 |
| D379,081 | S * | 5/1997 | Wilson | D12/401 |
| 6,003,929 | A * | 12/1999 | Birdsell | B60P 7/0876 150/166 |
| 6,044,881 | A * | 4/2000 | Welch | B60J 11/00 150/166 |
| 6,209,599 | B1 * | 4/2001 | Richardson | B62J 19/00 150/167 |
| 6,439,815 | B1 * | 8/2002 | Liu | B60P 7/0815 410/101 |
| D489,035 | S * | 4/2004 | Butler | D12/401 |
| 7,726,710 | B2 * | 6/2010 | Handwerker | E04G 21/24 294/215 |
| D620,426 | S * | 7/2010 | Conti | D12/401 |
| 8,439,422 | B2 * | 5/2013 | Ricks, Jr. | B60P 7/0876 296/98 |
| D689,426 | S * | 9/2013 | Jaramillo | D12/403 |
| 8,905,459 | B1 * | 12/2014 | Wiggins, Jr. | B60J 11/06 296/136.01 |

\* cited by examiner

*Primary Examiner* — Fenn C Mathew
*Assistant Examiner* — Cynthia F Collado
(74) *Attorney, Agent, or Firm* — Eldredge Law Firm, LLC; Richard Eldredge

(57) ABSTRACT

A vehicle cover includes an elongated elastic body having a plurality of tubular channels extending parallel to each other and in gaseous communication with each other; a plurality of horizontal straps extending parallel to each other and running perpendicular to the plurality of tubular channels; a first strap and a second strap secured to the body and configured to intersect with each other at a center of the body; a hole extending through a thickness of the body and configured to receive an antenna of the vehicle therethrough; and a pump secured to the body and configured to drive air into the plurality of horizontal straps.

1 Claim, 4 Drawing Sheets

VEHICLE HAIL COVER SYSTEM AND METHOD OF USE

BACKGROUND

1. Field of the Invention

The present invention relates generally to vehicle covers, and more specifically, to an inflatable cover for protecting a vehicle from hail damage.

2. Description of Related Art

Vehicle covers are well known in the art and are effective means for protecting vehicles from the elements. For example, FIG. 1 depicts an oblique view of a vehicle cover 101 configured to snugly fit against the body of vehicle 103. During use, the cover 101 protects the vehicle from sun exposure, dust, rain, and/or other elements.

Although effective in most applications, it should be understood that the vehicle cover 101 has limitations. For example, the cover is generally manufactured with a thin material with little to no cushioning. This feature provides no protection during a hail storm, wherein the hail can damage the vehicle body.

Accordingly, although great strides have been made in the area of vehicle covers, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
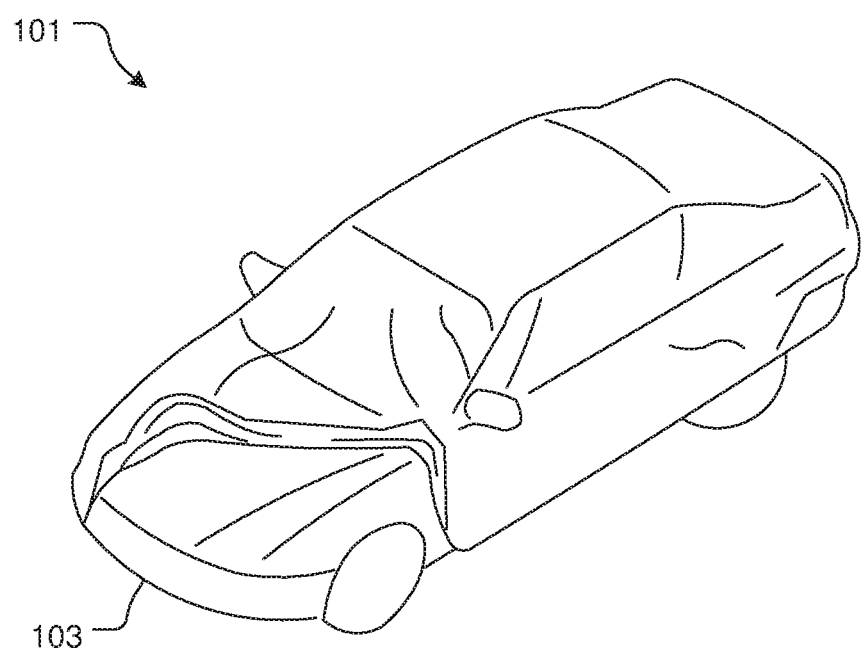
FIG. 1 is an oblique view of a conventional vehicle cover.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
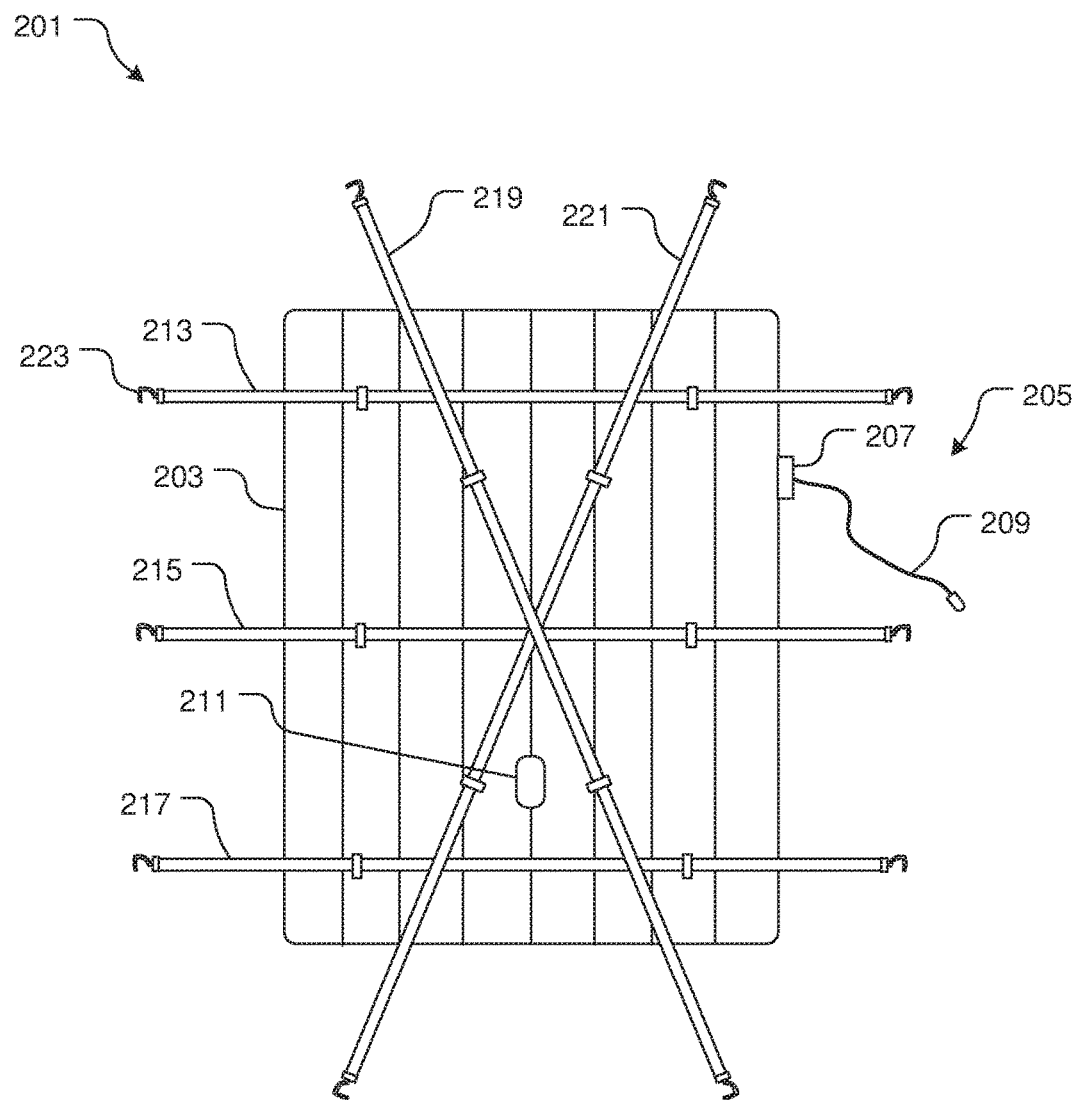
FIG. 2 is a top view of a vehicle cover system and method of use in accordance with a preferred embodiment of the present application.
Figure 3A:
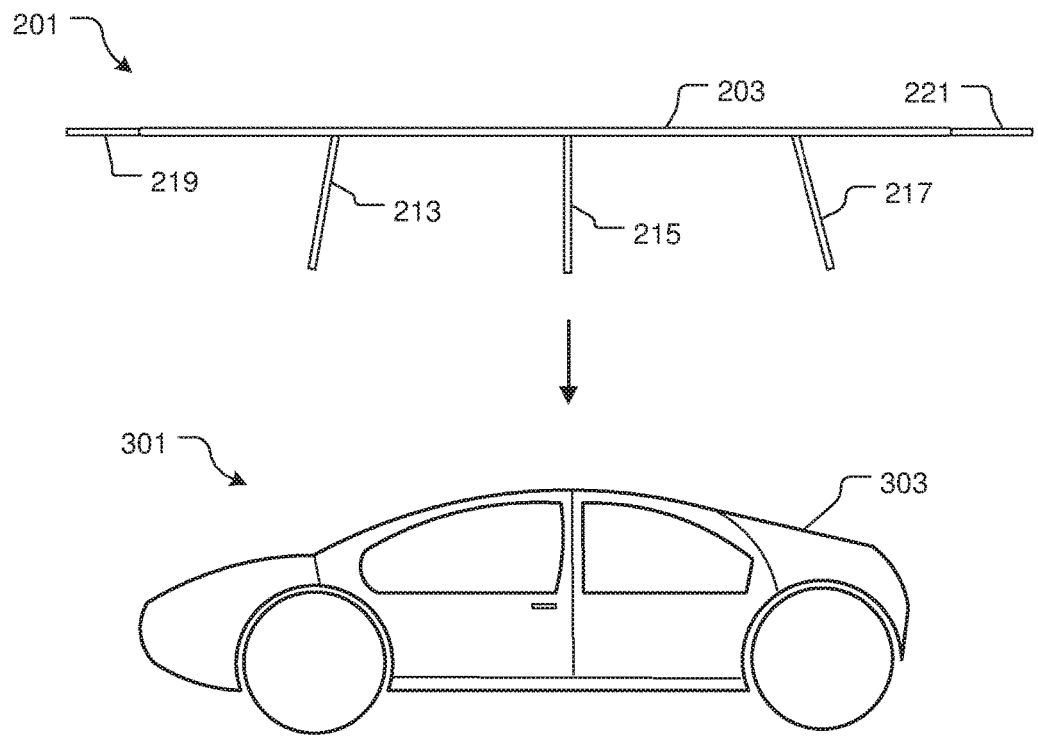
FIGS. 3A and 3B are side views of the system of FIG. 2.
Figure 3B:
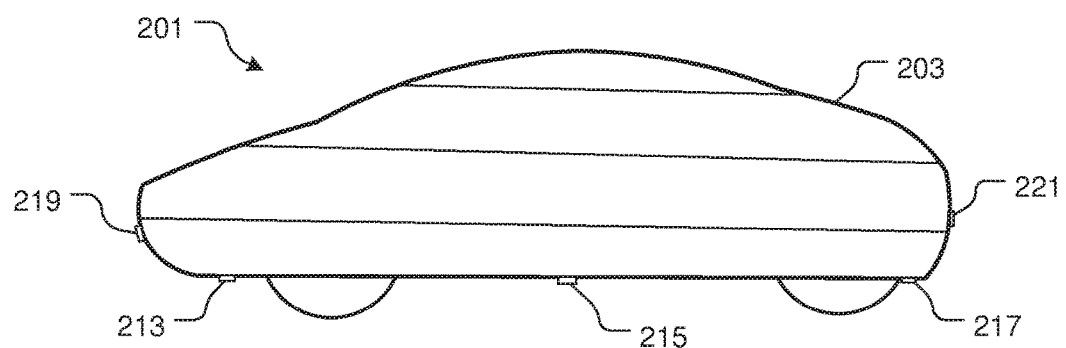
Figure 4:
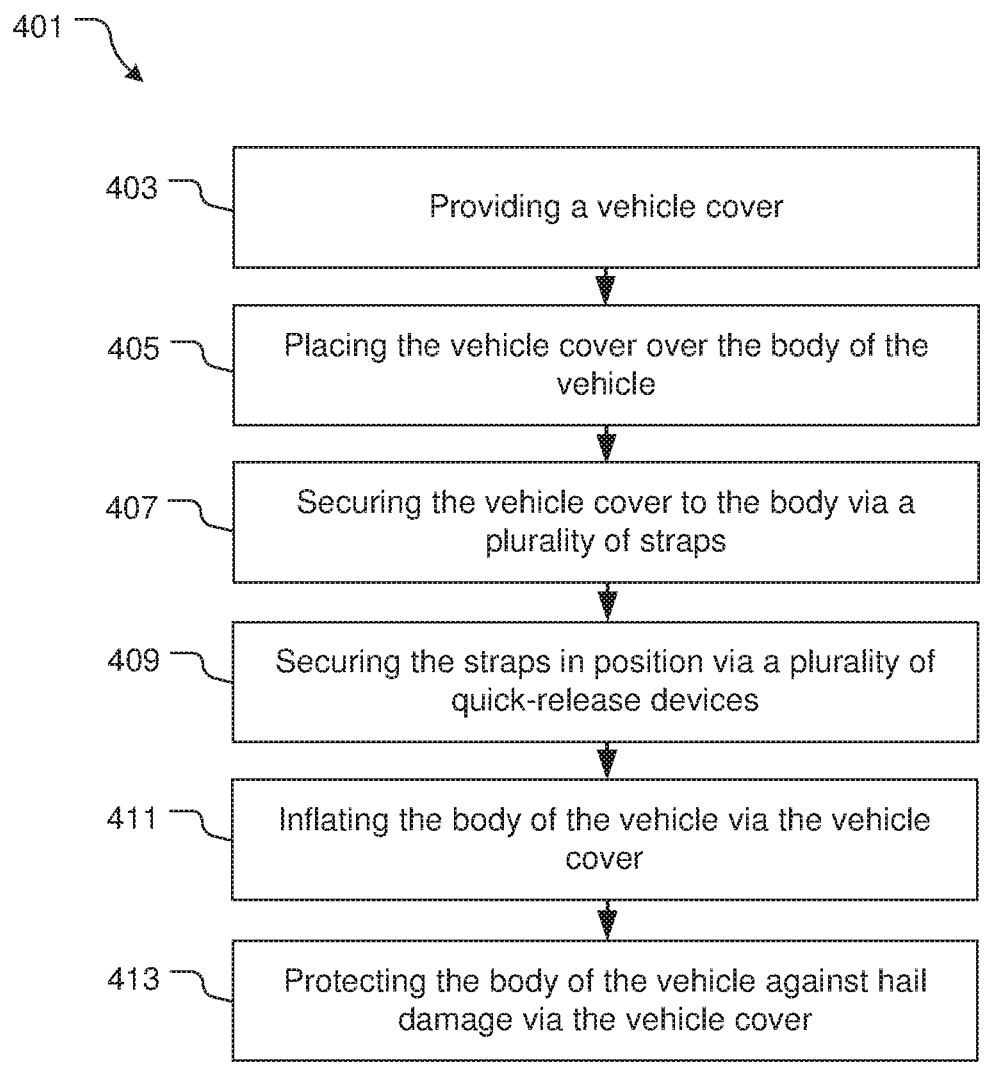
FIG. 4 is a flowchart depicting the preferred method of use.

Referring now to the drawings wherein like reference characters identify corresponding or similar elements throughout the several views, FIGS. 2-4 depict various views of a vehicle cover system 201 and method of use in accordance with a preferred embodiment of the present application. It will be appreciated that system 201 overcomes one or more of the above-listed problems commonly associated with the conventional vehicle covers.

In the contemplated embodiment, system 201 includes one or more of bendable body 203 forming a fluid sealed cavity, which is inflated via a pump assembly 205. During use, the hollow center of body 203 is inflated to create a cushion of air that prevents hail and/or other debris from coming into contact with the body of the vehicle.

The pump assembly 205 engages with a valve in gaseous communication with the inflatable cavity of body 203. The assembly 205 includes a pump 207 configured to engage with the valve and is powered via a cord 209 that connects to a power source, e.g., a car cigarette lighter. In one contemplated embodiment, the pump 207 is removably attached to the valve; however, it is also contemplated having a pump 207 rigidly attached to the valve in addition to being disposed within the hollow cavity of the body 203.

The body 203 is provided with an opening 211 extending through the thickness of the body and configured to receive an antenna (not shown) therethrough. The body 203 is secured to the vehicle via a plurality of straps 213, 215, 217, 219, and 221 configured to extend the horizontal and vertical lengths of the body 203 and all having a quick-release device 223 at opposing ends for quick engagement with the body 303 of vehicle 301, as depicted in FIGS. 3A and 3B.

A flowchart 401 is used to depict the preferred process of securing the system 201 to the vehicle. It is contemplated securing the cover body directly to the vehicle body via one or more straps and quick-release device, e.g., hooks, and thereafter inflating the cover body with the pump assembly.

It will be appreciated that the cover body could conform to the shape and size of the vehicle body or be universal to all types of vehicle bodies. When inflated and properly assembled, the vehicle cover protects the vehicle body from hail damage. These steps are outlined in boxes 403, 405, 407, 409, 411, and 413.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A vehicle cover, comprising:
   an elongated elastic body having a plurality of tubular channels extending parallel to each other and in gaseous communication with each other;
   a plurality of horizontal straps extending parallel to each other and running perpendicular to the plurality of tubular channels;
   a first strap and a second strap secured to the body and configured to intersect with each other at a center of the body, the first strap and the second strap extending at an angle relative to the plurality of horizontal straps;
   a hole extending through a thickness of the body and configured to receive an antenna of the vehicle therethrough; and
   a pump secured to the body and configured to drive air into the plurality of tubular channels, the pump is disposed within the elongated elastic body.

* * * * *